US007266812B2

(12) United States Patent
Pagnano

(10) Patent No.: US 7,266,812 B2
(45) Date of Patent: Sep. 4, 2007

(54) ARRANGEMENTS, STORAGE MEDIUMS AND METHODS FOR TRANSMITTING A NON-PROPRIETARY LANGUAGE DEVICE DESCRIPTION FILE ASSOCIATED WITH A FIELD DEVICE USING A WEB SERVICE

(75) Inventor: Marco Aurelio de Oliveira Pagnano, Sertaozinho (BR)

(73) Assignee: Smar Research Corporation, Ronkonkoma, NY (US)

( * ) Notice: Subject to any disclaimer, the term of this patent is extended or adjusted under 35 U.S.C. 154(b) by 468 days.

(21) Appl. No.: 10/413,959

(22) Filed: Apr. 15, 2003

(65) Prior Publication Data

US 2004/0210878 A1   Oct. 21, 2004

(51) Int. Cl.
G06F 9/45 (2006.01)
G06F 15/00 (2006.01)
G06F 17/00 (2006.01)

(52) U.S. Cl. .................. 717/136; 715/513; 700/90
(58) Field of Classification Search ........ 717/136–143, 717/114–118, 106; 715/500, 513
See application file for complete search history.

(56) References Cited

U.S. PATENT DOCUMENTS

| 5,103,409 | A | 4/1992 | Shimizu et al. |
|---|---|---|---|
| 5,521,848 | A | 5/1996 | Bayne et al. |
| 5,571,007 | A | 11/1996 | Ishiguro et al. |
| 5,841,654 | A | 11/1998 | Verissimo et al. |
| 5,854,994 | A | 12/1998 | Canada et al. |
| 5,867,809 | A | 2/1999 | Soga et al. |
| 5,903,455 | A | 5/1999 | Sharpe et al. |
| 5,926,176 | A | 7/1999 | McMillan et al. |
| 5,960,214 | A | 9/1999 | Sharpe, Jr. et al. |
| 5,971,581 | A | 10/1999 | Gretta et al. |
| 5,995,916 | A | 11/1999 | Nixon et al. |
| 6,006,171 | A | 12/1999 | Vines et al. |
| 6,094,600 | A | 7/2000 | Sharpe, Jr. et al. |
| 6,112,246 | A * | 8/2000 | Horbal et al. ............ 709/230 |
| 6,157,943 | A * | 12/2000 | Meyer ............ 709/203 |
| 6,208,247 | B1 | 3/2001 | Agre et al. |
| 6,223,190 | B1 * | 4/2001 | Aihara et al. ............ 715/513 |
| 6,298,454 | B1 | 10/2001 | Schleiss et al. |

(Continued)

OTHER PUBLICATIONS

Mary Kirtland, A Platform for Web Services, Jan. 2001, Microsoft Developer Network.*

(Continued)

Primary Examiner—Antony Nguyen-Ba
(74) Attorney, Agent, or Firm—Dorsey & Whitney LLP

(57) ABSTRACT

An arrangement, storage medium and method are provided to convert a particular proprietary language Device Description file and/or a particular Device Description language source code associated with a particular type of a field device into a particular non-proprietary language Device Description file, and to transmit the particular non-proprietary language Device Description file from a first processing system to a second processing system using a particular Web Service. For example, the particular non-proprietary language Device Description file can be a non-binary coded Device Description file, and the non-binary coded Device Description file can be an Extensible Mark-up Language Device Description file. Moreover, the second processing system can use Simple Object Access Protocol to request the particular Web Service used in the transmission of the Extensible Mark-up Language Device Description file.

23 Claims, 4 Drawing Sheets

U.S. PATENT DOCUMENTS

| | | |
|---|---|---|
| 6,326,758 B1 | 12/2001 | Discenzo |
| 6,330,517 B1 | 12/2001 | Dobrowski et al. |
| 6,347,307 B1 | 2/2002 | Sandhu et al. |
| 6,363,398 B1 | 3/2002 | Andersen |
| 6,370,448 B1 | 4/2002 | Eryurek |
| 6,377,859 B1 | 4/2002 | Brown et al. |
| 6,424,930 B1 | 7/2002 | Wood |
| 6,434,512 B1 | 8/2002 | Discenzo |
| 6,446,202 B1 | 9/2002 | Krivoshein et al. |
| 6,490,543 B1 | 12/2002 | Jaw |
| 6,505,086 B1* | 1/2003 | Dodd et al. ............ 700/65 |
| 6,631,298 B1 | 10/2003 | Pagnano et al. |
| 6,684,339 B1 | 1/2004 | Willig |
| 6,697,805 B1* | 2/2004 | Choquier et al. ........ 707/10 |
| 6,725,182 B2 | 4/2004 | Pagnano et al. |
| 2002/0080938 A1 | 6/2002 | Alexander et al. |
| 2002/0083172 A1 | 6/2002 | Knowles et al. |
| 2002/0143421 A1 | 10/2002 | Wetzer |
| 2002/0169514 A1 | 11/2002 | Eryurek et al. |
| 2002/0178126 A1 | 11/2002 | Beck et al. |
| 2003/0005486 A1 | 1/2003 | Ridolfo et al. |
| 2003/0028269 A1 | 2/2003 | Spriggs et al. |
| 2003/0046366 A1 | 3/2003 | Pardikar et al. |
| 2003/0050942 A1* | 3/2003 | Ruellan et al. ........ 707/513 |
| 2004/0024813 A1 | 2/2004 | Pagnano |
| 2004/0103144 A1* | 5/2004 | Sallam et al. .......... 709/203 |
| 2004/0117166 A1 | 6/2004 | Cassiolato |
| 2004/0136027 A1* | 7/2004 | Zehler .................. 358/1.15 |
| 2004/0210878 A1 | 10/2004 | Pagnano |
| 2004/0230582 A1 | 11/2004 | Pagnano |
| 2005/0007249 A1* | 1/2005 | Eryurek et al. ........ 340/511 |

OTHER PUBLICATIONS

Thron, Mario, "Code Generation by XML-Device Descriptions" (Abstract), Jun. 2001 to Jul. 2002.

Kirtland, Mary, "A Platform for Web Services," Microsoft Developer Network, Jan. 2001.

10/373,552, filed Feb. 24, 2003, Marco Aurelio de Oliveira Pagnano et al.

10/436,956, filed May 13, 2003, Pagnano.

PROFIBUS International: "PROFIBUS Technical Overview", undated.

Automation Tech. Products: "Field Device Tool FDT", undated.

Industrial Automation Insider: "PROFIBUS Offers FDT Spec to Other Fieldbuses," vol. 6 No. 1 Jan. 2002.

Allen, C of Fisher-Rosemount, "Intelligent Values & Actuators", I.E.E. Conference, Dec. 21, 1994.

Castro, Elizabeth, "XML For the World Wide Web," 2001, Peachpit Press, pp. 17 and 135.

Mario Thron: "XML-Technology of bus-linked components" in Description Methods for Functions and Devices (Abstract), undated.

* cited by examiner

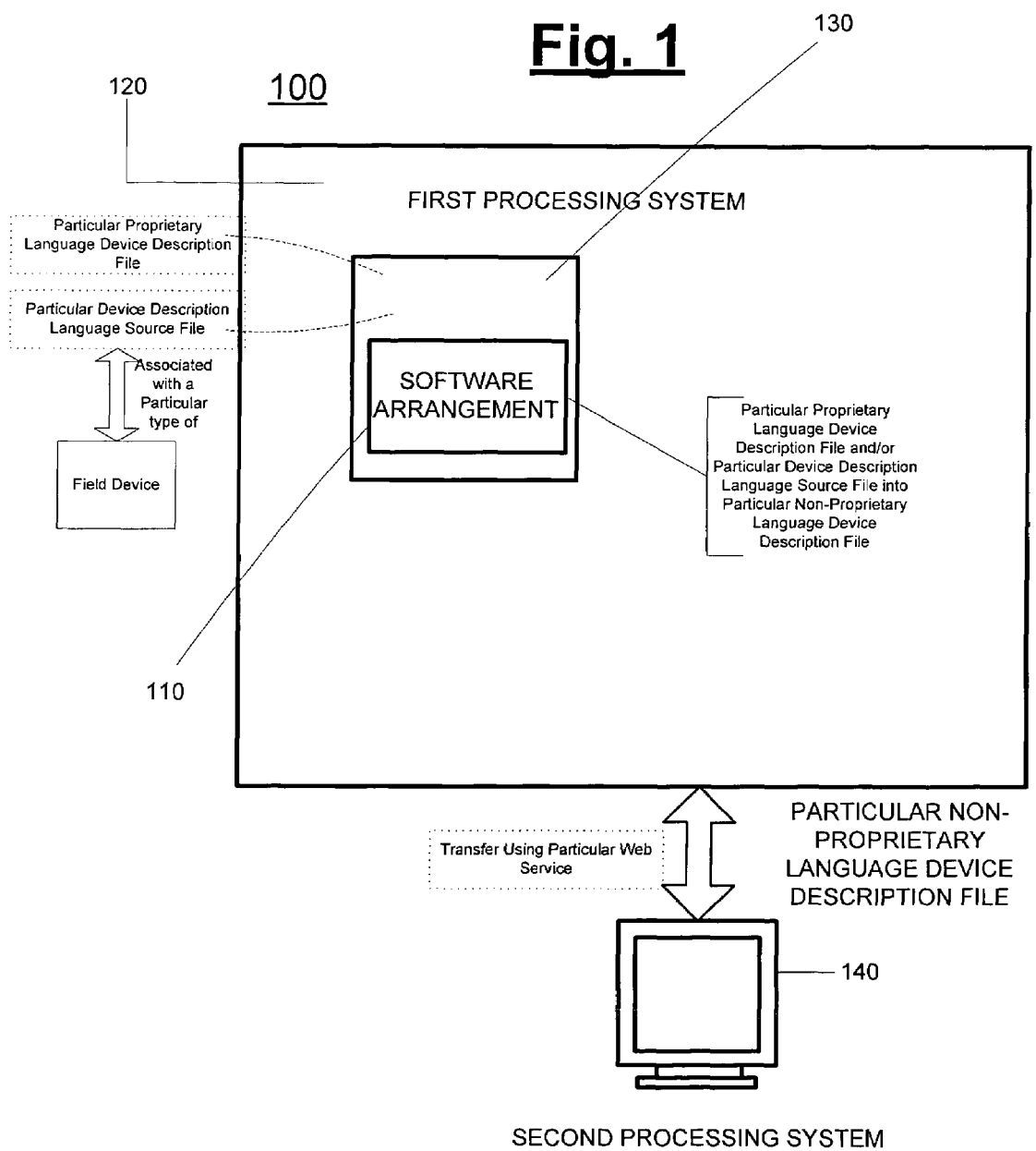

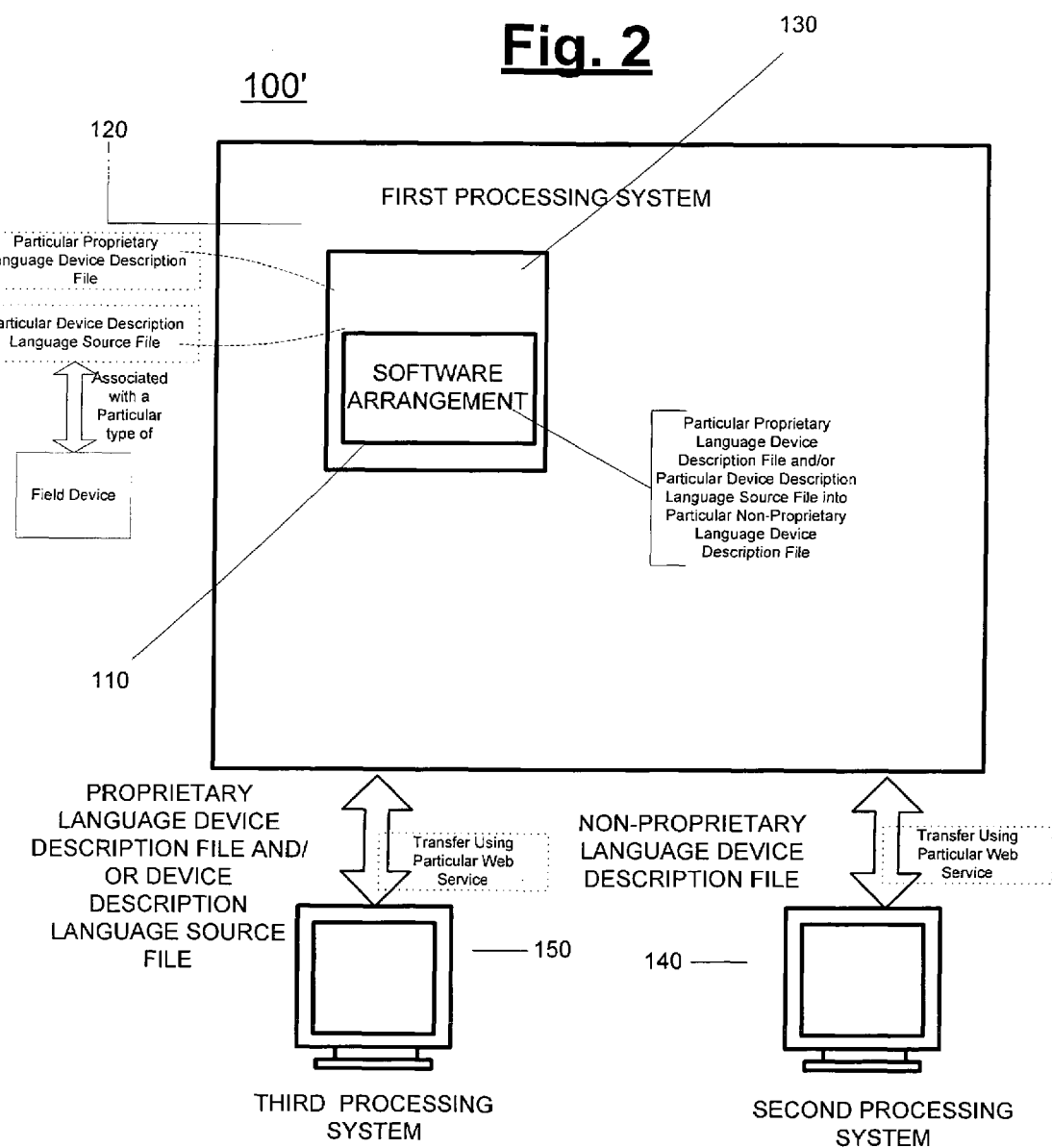

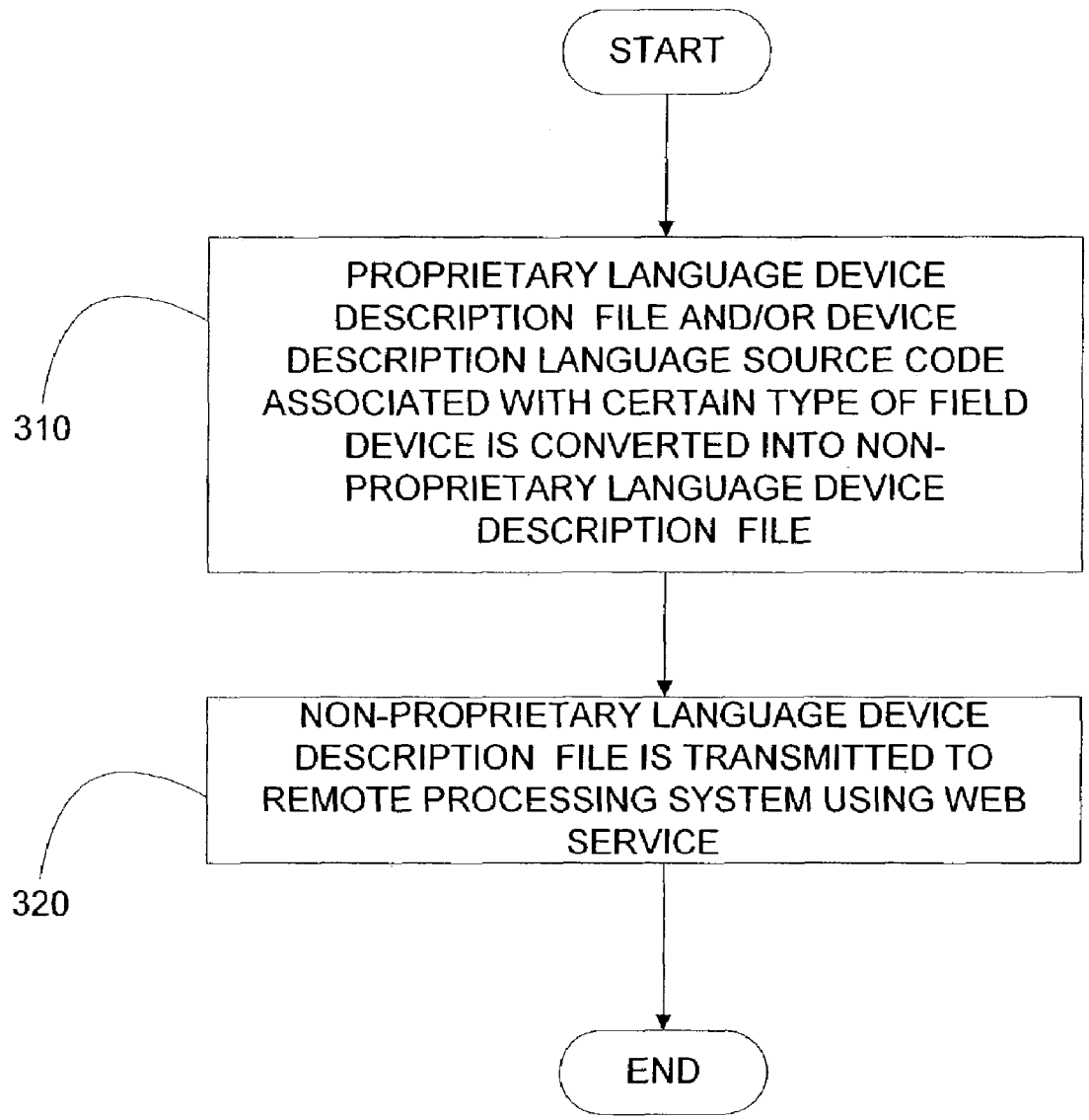

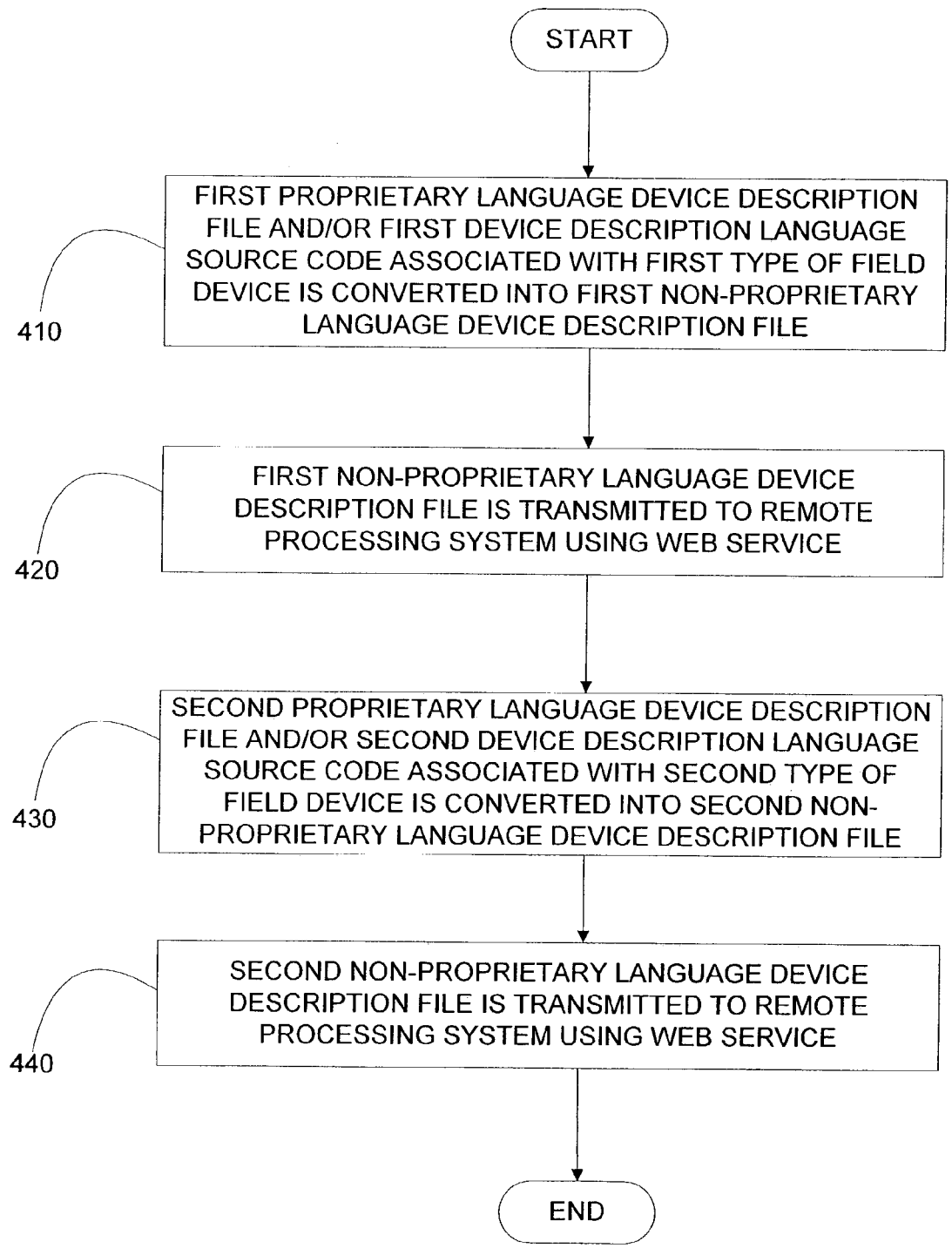

ARRANGEMENTS, STORAGE MEDIUMS AND METHODS FOR TRANSMITTING A NON-PROPRIETARY LANGUAGE DEVICE DESCRIPTION FILE ASSOCIATED WITH A FIELD DEVICE USING A WEB SERVICE

FIELD OF THE INVENTION

The present invention relates generally to an arrangement, storage medium and method for transmitting a non-proprietary language Device Description file associated with a field device using a Web Service. In particular, the present invention is directed to an arrangement, storage medium and method in which a first processing system converts a particular proprietary language Device Description file and/or a particular Device Description language source code associated with a particular type of a field device into a particular non-proprietary language Device Description file, and transmits such particular non-proprietary language Device Description file to a second processing system using a particular Web Service.

BACKGROUND OF THE INVENTION

Conventional arrangements used by processing plants generally include many smart field devices (e.g., temperature sensors, pressure sensors, flow-rate sensors, etc.) which control and measure parameters within a process. Each such smart field device can include several function blocks. For example, the smart field device may include one or more input blocks, output blocks, and/or control blocks. Each block of the smart field device includes one or more parameters (e.g., an attribute of the block which characterizes, affects, or is otherwise related to the block). For example, parameters can describe whether the block is an input block, an output, or a control block. The parameters can also describe the maximum operating/measurement range of the block, the mode of the block, the value of the block measurement, etc. Moreover, each parameter includes one or more properties, and each property describes a portion of the information associated with the parameter. For example, these properties can describe the name of the parameter (e.g., temperature), the value (e.g., a temperature) measured by the smart field device, the units in which the measured value is expressed (e.g., degrees centigrade or degrees Fahrenheit), etc.

Moreover, Device Description Languages, Device Description Language source files, and Device Description Services have been developed to allow a user (e.g., an employee of the processing plant) to communicate with various smart field devices which are used in the process. Device Description Language is a human-readable language that provides, for example, a protocol for describing the data available from a particular smart field device, the meaning of the data retrieved from the smart field device, the format for communicating with the smart field device to obtain data, user interface information about the device (e.g., edit displays and menus), etc. Nevertheless, it will be understood by those of ordinary skill in the art that a Device Description can provide any information associated with the field device, such as any information used to implement the field device. A Device Description Language source file is a human-readable text that is generally written by developers of the smart field device. In generating the Device Description Language source file for a particular smart field device, the developer can use the Device Description Language to describe core parameter characteristics of the device. For example, different Device Description Language source files may be associated with different types of smart field devices (e.g., one Device Description Language source file may be associated with a first pressure sensor, and another Device Description Language source file can be associated with a second pressure sensor).

In the conventional arrangements, the source code of the Device Description Language source file is compiled into binary format using a tokenizer to generate a machine-readable file known as a binary coded device description file. Each binary coded Device Description file may be forwarded to a developer of a host application. Alternatively, when PROFIBUS™ protocol is used, the source code of the Device Description Language source file is forwarded to the developer of the host application. Subsequently, the developer can develop the host application, and can also sell the host application and the binary coded Device Description files and/or the source code of the Device Description Language source files to an end user. Moreover, the end user may store the binary coded Device Description files and/or the source code of the Device Description Language source files on a storage device of a host processing system, and the host processing system can decode the binary coded Device Description file and/or the source code of the Device Description Language source files using an interpreter, also known as the Device Description Service. The host processing system may then display the decoded information to the end user.

Nevertheless, in the conventional arrangements, the binary coded Device Description file and/or the source code of the Device Description Language source file associated with each type of smart field device is generally stored on the storage device of the host processing system, which may decrease an amount of memory or recordable space available to the host processing system for implementing additional applications. Moreover, the end user of the host processing system continuously downloads or installs the most recent version of the binary coded Device Description file and/or the source code of the Device Description Language source file whenever the binary coded Device Description file or the source code is modified or updated.

SUMMARY OF THE INVENTION

Therefore, a need has arisen to provide an arrangement and method for converting a proprietary language Device Description file associated with a field device into a non-proprietary language Device Description file, and for transmitting the non-proprietary language Device Description file using a Web Service, thus overcoming the above-described and other shortcomings of the prior art.

One of the advantages of the present invention is that in an arrangement and method, a proprietary language Device Description file and/or a Device Description language source code associated with a field device can be converted into a non-proprietary language Device Description file, and the non-proprietary language Device Description file is preferably transmitted to a host processing system using a Web Service. Consequently, the host processing system does not have to receive and download the proprietary language Device Description file and/or the Device Description language source code, thus increasing the amount of memory available to the host processing system for implementing additional applications. Further, the host processing system does not need to continually download or install the most recent version of the proprietary language Device Description file and/or the Device Description language source code associated with the field device when the proprietary language Device Description file and/or the Device Description language source code is modified.

This and other advantages can be achieved with an exemplary embodiment of the arrangement, a logic arrangement, a storage medium, a software arrangement and/or method according to the present invention. In particular, a first processing system can convert a particular proprietary language Device Description file and/or a particular Device Description language source code associated with a particular type of field device (e.g., a particular type of smart field device, such as a sensor) into a particular non-proprietary language Device Description file. For example, the particular proprietary language Device Description file can be a binary coded Device Description file, and the particular non-proprietary language Device Description file can be a non-binary coded Device Description file. Moreover, the non-binary coded Device Description file can be an Extensible Mark-up Language ("XML") Device Description file. The first processing system may also transmit the particular non-proprietary language Device Description file to a second (e.g., host) processing system using a particular Web Service. Moreover, the second processing system can use a Simple Object Access Protocol ("SOAP") to request the particular Web Service used in transmitting the particular non-proprietary language Device Description file.

The particular non-proprietary language Device Description file and/or the particular Device Description language source code can include information associated with a protocol for describing data available from the particular field device, and/or a meaning of data received from the particular field device, and/or one or more formats for communicating with the particular field device, etc. Moreover, the first processing system also may convert a further proprietary language Device Description file and/or a further Device Description language source code associated with a further type of field device into a further non-proprietary language Device Description file. For example, the further proprietary language Device Description file can be the binary coded Device Description file, and the further non-proprietary language Device Description file can be the non-binary coded Device Description file, such as the XML Language Device Description file. The first processing system may also transmit the further non-proprietary language Device Description file to the second processing system using a further Web Service. Moreover, the second processing system can use the Simple Object Access Protocol ("SOAP") to request the further Web Service to be used for transmitting such further non-proprietary language Device Description file, and the further non-proprietary language Device Description file may be different than the particular non-proprietary language Device Description file.

BRIEF DESCRIPTION OF THE DRAWINGS

FIG. 1 is a schematic diagram of a first exemplary embodiment of a system which includes a software arrangement according to the present invention for converting a proprietary language Device Description file and/or a Device Description language source code associated with a field device into a non-proprietary language Device Description file, and transmitting such non-proprietary language Device Description file using a Web Service.

FIG. 2 is a schematic diagram of a second exemplary embodiment of the system including the software arrangement according to the present invention.

FIG. 3 is a top-level flow diagram of a first exemplary embodiment of a method according to the present invention for converting the proprietary language Device Description file and/or the Device Description language source code associated with the field device into the non-proprietary language Device Description file, and transmitting such non-proprietary language Device Description file using the Web Service.

FIG. 4 is a top-level flow diagram of a second exemplary embodiment of the method according to the present invention.

DETAILED DESCRIPTION

Exemplary embodiments of the present invention and their advantages may be understood by referring to FIGS. 1-4, like numerals being used for like corresponding parts in the various drawings.

FIG. 1 shows a first exemplary embodiment of a system 100 which includes a storage device 130 (e.g., RAM, hard drive, CD-ROM, etc.) that provides thereon a software arrangement 110, and has a first processing system 120 (e.g., a microprocessor). This software arrangement 110 may be executed by the first processing system 120 to convert a proprietary language Device Description file associated with a particular field device (e.g., a smart field device, such as a pressure sensor, a temperature sensor, a flow-rate sensor, etc. that are capable of performing operations) into a non-proprietary language Device Description file. Alternatively, the software arrangement 110 can be executed by the first processing system 120 to convert a Device Description language source code associated with the particular field device into the non-proprietary language Device Description file. This software arrangement 110 may also be executed by the first processing system 120 to transmit such non-proprietary language Device Description file to a second processing system (e.g., a client's processing system) using a Web Service. As indicated above, the software arrangement 110 may be resident on the storage device 130 (e.g., a memory device, a hard drive, etc.) of the first processing system 120, and/or may also be stored on an external storage device. Instead of using the software arrangement 110, it is possible to utilize a hardware arrangement, a firmware arrangement and/or a combination thereof.

Web Services that can be utilized by the arrangements and methods of the present invention are programmable application logic accessible using standard Internet protocols. Unlike conventional component technologies, Web Services are not accessed via object-model-specific protocols, such as the Component Object Model, Remote Method Invocation, or Internet Inter-ORB Protocol. In contrast, Web Services may be accessed via ubiquitous Web protocols and data formats, such as Hypertext Transfer Protocol ("HTTP") and Extensible Markup Language ("XML"). Moreover, a Web Service interface may be defined in terms of messages which the Web Service accepts and generates, and a Web Service can be used by applications implemented in any language for any platform. In this manner, the Web Services may be platform-independent, language-independent, and reusable.

FIG. 2 shows a second exemplary embodiment of the system 100' according to the present invention which is substantially similar to the first embodiment of the system 100 illustrated in FIG. 1, except as indicated. In this system 100', during operation, the first processing system 120 may receive a particular proprietary language Device Description file associated with a particular type of a field device from a third processing system 150. For example, the third processing system 150 may be a processing system of a manufacturer of a particular field device, a developer of a host application, the Fieldbus Foundation®, etc. Alternatively, the first processing system 120 may receive a particular Device Description language source code associated with the particular type of the field device.

After the first processing system 120 receives the particular proprietary language Device Description file and/or the particular Device Description language source code, the first processing system 120 may convert such proprietary language Device Description file and/or Device Description language source code into a non-proprietary language Device Description file. The first processing system 120 can also transmit such non-proprietary language Device Description file to the second processing system 140 using the Web Service for the systems 100, 100' illustrated in FIGS. 1 and 2. For example, the proprietary language Device Description file can be the binary coded Device Description file, and such non-proprietary language Device Description file can be the non-binary coded Device Description file. Further, such non-binary coded Device Description file can be the XML Device Description file, which may allow the second processing system 140 to readily display particular information/data contained in the proprietary language Device Description file (e.g., to the client) on a display device. Moreover, the second processing system 140 can use the Simple Object Access Protocol ("SOAP") to request the Web Service to be used for transmitting the non-proprietary language Device Description file. After the user (e.g., an employee of the client) receives the particular information/data from the first processing system 120, the user is enabled to communicate with the various field devices that may be used to control and measure parameters within the process. It will be readily understood by those of ordinary skill in the art that the system 100, 100' may be used to transmit a number of different non-proprietary language Device Description files associated with different types of the field devices to the second processing system 140.

FIG. 3 shown a first exemplary embodiment of a method 300 according to the present invention in which the proprietary language Device Description file and/or the Device Description language source code associated with the field device is converted into the non-proprietary language Device Description file, and transmitting such non-proprietary language Device Description file using the Web Service. Particularly, in step 310, a proprietary language Device Description file and/or the Device Description language source code associated with a certain type of the field device is converted into the non-proprietary language Device Description file (e.g., by the first processing system 120). Then, in step 320, the non-proprietary language Device Description file is transmitted (e.g., from the first processing system 120) to a remote processing system (e.g., the second processing system 140) using the Web Service.

FIG. 4 shows a second exemplary embodiment of the method 400 according to the present invention in which the proprietary language Device Description file and/or the Device Description language source code associated with the field device is converted into the non-proprietary language Device Description file, and transmitting such non-proprietary language Device Description file using the Web Service. Particularly, in step 410, a first proprietary language Device Description file and/or a first Device Description language source code associated with a first type of the field device is converted into a first non-proprietary language Device Description file (e.g., by the first processing system 120). Then, in step 420, the first non-proprietary language Device Description file is transmitted (e.g., from the first processing system 120) to a remote processing system (e.g., the second processing system 140) using the Web Service. Moreover, in step 430, a second proprietary language Device Description file and/or a second Device Description language source code associated with a second type of the field device is converted into a second non-proprietary language Device Description file (e.g., by the first processing system 120). Then, in step 440, such second non-proprietary language Device Description file is transmitted (e.g., from the first processing system 120) to the remote processing system (e.g., the second processing system 140) using the Web Service. For example, the second non-proprietary language Device Description file can be different than the first non-proprietary language Device Description file.

While the invention has been described in connecting with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It is intended that the specification and the described examples are considered as exemplary only, with the true scope and spirit of the invention indicated by the following claims.

What is claimed is:

1. An arrangement, comprising:
a first processing system operable to convert at least one of a particular proprietary language Device Description file or a particular Device Description language source code associated with a particular type of a field device into a particular non-proprietary language Device Description file, and to transmit the particular non-proprietary language Device Description file to a second processing system using a particular Web Service.

2. The arrangement of claim 1, wherein at least one of the particular proprietary language Device Description file and the particular Device Description language source code comprises information associated with at least one of a protocol for describing data available from the field device, an interpretation of data received from the field device, and at least one format for communicating with the field device.

3. The arrangement of claim 1, wherein the first processing system is further operable to convert at least one of a further proprietary language Device Description file and a further Device Description language source code associated with a further type of a field device into a further non-proprietary language Device Description file, and to transmit the further non-proprietary language Device Description file to the second processing system using a further Web Service, and wherein the further non-proprietary language Device Description file is different from the particular non-proprietary language Device Description file.

4. The arrangement of claim 3, wherein the particular type of the field device is a first sensor, and the further type of the field device is a second sensor.

5. The arrangement of claim 1, wherein the particular proprietary language Device Description file is a binary coded Device Description file, and wherein the particular non-proprietary language Device Description file is a non-binary coded Device Description file.

6. The arrangement of claim 5, wherein the particular non-binary coded Device Description file is an Extensible Mark-up Language Device Description file.

7. The arrangement of claim 6, wherein the second processing system is operable to implement a Simple Object Access Protocol to request the particular Web Service used in the transmission of the Extensible Mark-up Language Device Description file.

8. A logic arrangement embodied in a computer-readable medium, which, when executed by a first processing system, configures the first processing system to perform the steps comprising of:
converting at least one of a particular proprietary language Device Description file or a particular Device Description language source code associated with a particular type of a field device into a particular non-proprietary language Device Description file; and
transmitting the particular non-proprietary language Device Description file to a second processing system using a particular Web Service.

9. The logic arrangement of claim 8, wherein at least one of the particular proprietary language Device Description file and the particular Device Description language source code comprises information associated with at least one of a protocol for describing data available from the field device, an interpretation of data received from the field device, and at least one format for communicating with the field device.

10. The logic arrangement of claim 8, wherein, when executed by the first processing system, the logic arrangement further configures the first processing system to perform the steps comprising of:
converting at least one of a further proprietary language Device Description file or a further Device Description language source code associated with a further type of a field device into a further non-proprietary language Device Description file; and
transmitting the further non-proprietary language Device Description file to the second processing system using a further Web Service, wherein the further non-proprietary language Device Description file is different from the particular non-proprietary language Device Description file.

11. The logic arrangement of claim 10, wherein the particular type of the field device is a first sensor, and the further type of the field device is a second sensor.

12. The logic arrangement of claim 8, wherein the particular proprietary language Device Description file is a binary coded Device Description file, and wherein the particular non-proprietary language Device Description file is a non-binary coded Device Description file.

13. The logic arrangement of claim 12, wherein the particular non-binary coded Device Description file is an Extensible Mark-up Language Device Description file.

14. The logic arrangement of claim 13, wherein the second processing system is operable to implement a Simple Object Access Protocol to request the particular Web Service used in the transmission of the Extensible Mark-up Language Device Description file.

15. A storage medium including executable instructions thereon, wherein, when the executable instructions are executed by a first processing system, the executable instructions configure the first processing system to perform the steps comprising of:
converting at least one of a particular proprietary language Device Description file or a particular Device Description language source code associated with a particular type of a field device into a particular non-proprietary language Device Description file; and
transmitting the particular non-proprietary language Device Description file to a second processing system using a particular Web Service.

16. A software arrangement embodied in a computer-readable medium, which, when executed by a first processing system, is operable to perform the steps comprising of:
converting at least one of a particular proprietary language Device Description file or a particular Device Description language source code associated with a particular type of a field device into a particular non-proprietary language Device Description file; and
transmitting the particular non-proprietary language Device Description file to a second processing system using a particular Web Service.

17. A method comprising:
converting at least one of a particular proprietary language Device Description file or a particular Device Description language source code associated with a particular type of a field device into a particular non-proprietary language Device Description file; and
transmitting the particular non-proprietary language Device Description file to a remote processing system using a particular Web Service.

18. The method of claim 17, wherein at least one of the particular proprietary language Device Description file and the particular Device Description language source code comprises information associated with at least one of a protocol for describing data available from the field device, an interpretation of data received from the field device, and at least one format for communicating with the field device.

19. The method of claim 17, further comprising the steps of:
converting at least one of a further proprietary language Device Description file or a further Device Description language source code associated with a further type of a field device into a further non-proprietary language Device Description file; and
transmitting the further non-proprietary language Device Description file to a remote processing system using a further Web Service, wherein the further non-proprietary language Device Description Language file is different from the particular non-proprietary language Device Description Language file.

20. The method of claim 19, wherein the particular type of the field device is a first sensor, and the further type of the field device is a second sensor.

21. The method of claim 17, wherein the particular proprietary language Device Description file is a binary coded Device Description file, and wherein the particular non-proprietary language Device Description file is a non-binary coded Device Description file.

22. The method of claim 21, wherein the particular non-binary coded Device Description file is an Extensible Mark-up Language Device Description file.

23. The method of claim 22, wherein the remote processing system is operable to implement a Simple Object Access Protocol to request the particular Web Service used in the transmission of the Extensible Mark-up Language Device Description file.

* * * * *